Figure 4:
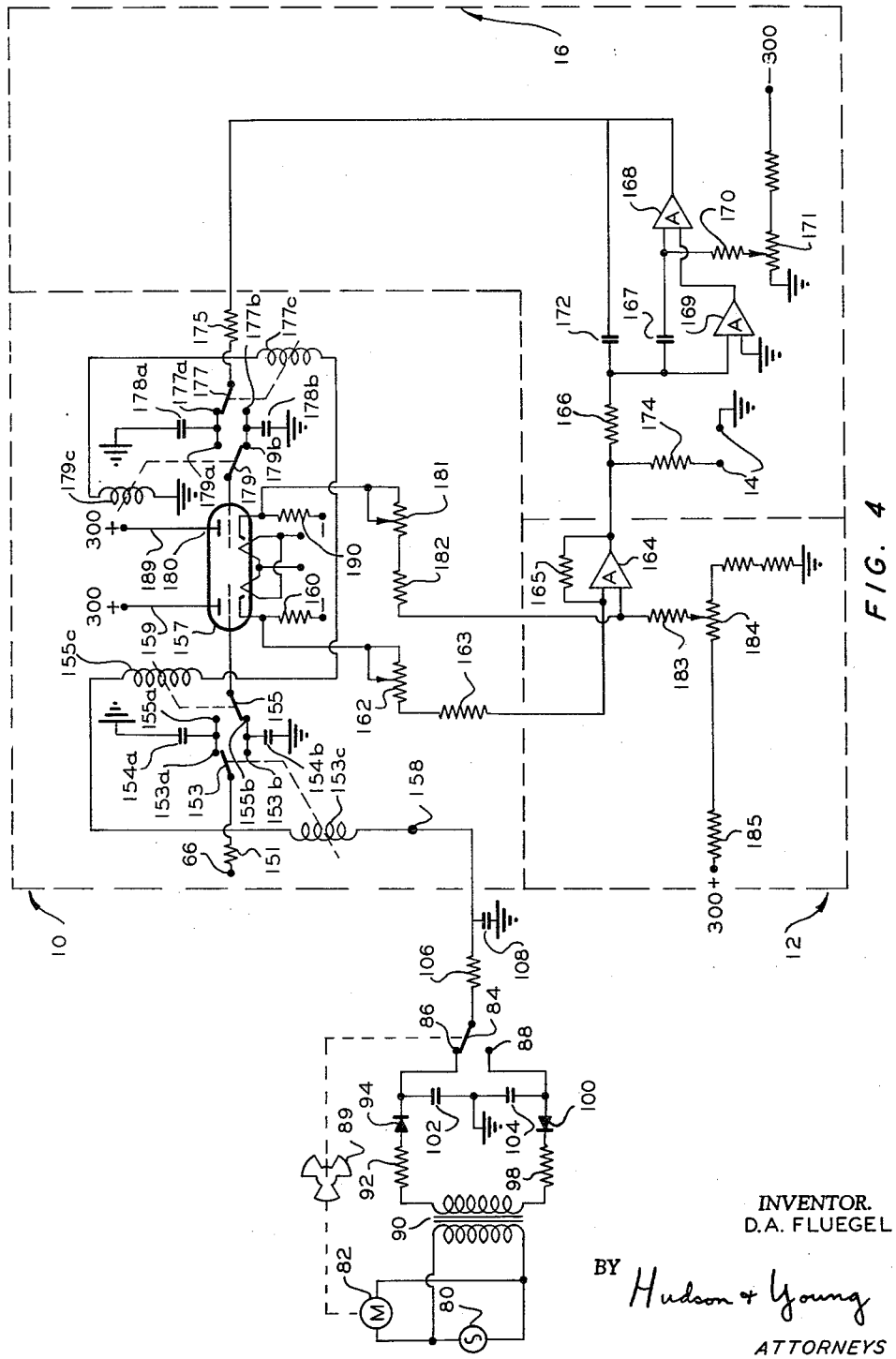

Aug. 21, 1962  D. A. FLUEGEL  3,050,253
DETECTOR FOR SENSING SMALL RATE OF CHANGE SIGNALS
Filed Nov. 17, 1958  2 Sheets-Sheet 1
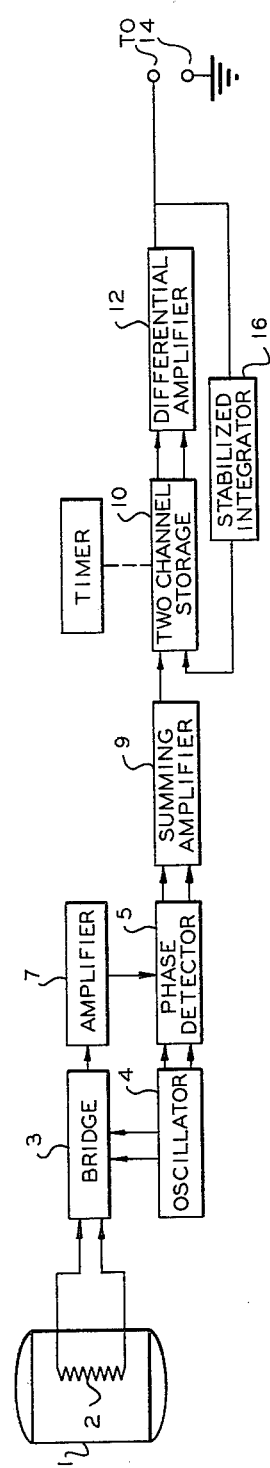
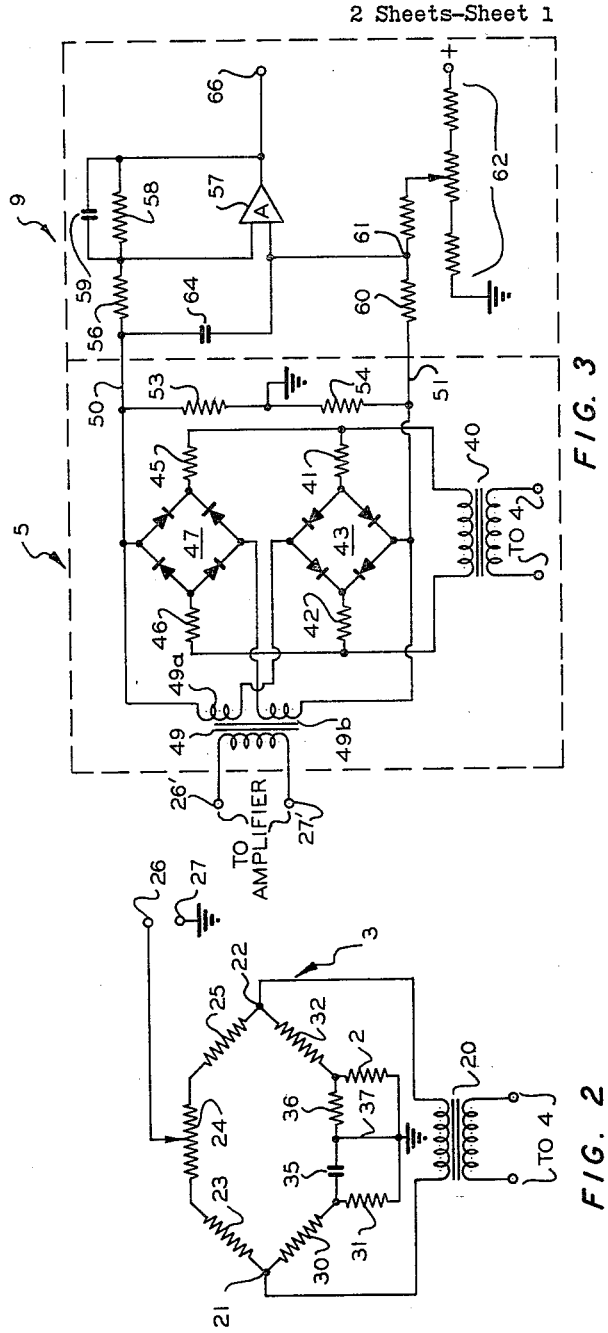
INVENTOR.
D.A. FLUEGEL
BY Hudson & Young
ATTORNEYS Aug. 21, 1962   D. A. FLUEGEL   3,050,253
DETECTOR FOR SENSING SMALL RATE OF CHANGE SIGNALS
Filed Nov. 17, 1958   2 Sheets-Sheet 2

INVENTOR.
D.A. FLUEGEL
BY Hudson & Young
ATTORNEYS

United States Patent Office 3,050,253
Patented Aug. 21, 1962

3,050,253
DETECTOR FOR SENSING SMALL RATE OF CHANGE SIGNALS
Dale A. Fluegel, Bartlesville, Okla., assignor to Phillips Petroleum Company, a corporation of Delaware
Filed Nov. 17, 1958, Ser. No. 774,308
7 Claims. (Cl. 235—183)

This invention relates to an improved method and apparatus for establishing a signal that is representative of a rate of change.

In the study of various processes it is oftentimes desirable to obtain a measure of the rate of change of the process due to the manipulation of certain factors within the process. For example, it might be desired to obtain the rate of change of flow in response to the opening of a valve. Also, it might be desirable to determine the changes within a fractionating column in response to increases and/or decreases in heat and/or reflux. In one specific application it is desirable to determine the rate of reactor temperature changes in polymerization reactions, such polymerizations being as described in United States Patent 2,825,721 issued March 4, 1958. These rates of change signals can be employed to set other elements of the control systems or can be recorded by a conventional recorder to preserve the data for study.

The instant invention provides means for sensing a condition, such as temperature, cooperating with means for computing from such sensed condition the change occurring during a time interval. In one specific embodiment this comprises an alternating current bridge supplying an output signal to a phase detector which then applies its output to a means for storing successive discrete values of the phase detector output signal. The means for storing is operated by a motor driven timing switch, which next removes the signal from storage and applies it to a differential amplifier. The output signal from the differential amplifier represents the rate of change of the measured condition, such as temperature. The output signal from the differential amplifier is recorded or used in the control system and is also applied to an integrator. It is then applied to a second means for storing successive discrete values of the integrated signal. The latter discrete values are likewise removed from storage by the timing switch and applied to another input terminal of the differential amplifier. The differential amplifier operates to compare the instantaneous value of a measured condition with the instantaneous value of that condition as it was at some predetermined time interval before the instant measurement. The integrator serves the purpose of providing a signal representative of the preceding instantaneous condition.

It is an object of this invention to provide method and apparatus for producing an output signal representative of the rate of change of an input signal. It is another object of this invention to provide method and apparatus for producing a signal representative of the rate of change of a measured condition. It is still another object of this invention to provide novel computing apparatus for comparing a presently occurring signal with a previously occurring signal, thereby to produce an output signal representative of the rate of change of the signal during the intervening time interval. Other objects and advantages will appear from the following disclosure.

In the drawings: FIGURE 1 represents schematically the overall arrangement of elements; FIGURE 2 shows schematically the novel Wheatstone bridge employed in FIGURE 1; FIGURE 3 illustrates schematically the novel phase detector employed in FIGURE 1; FIGURE 4 illustrates schematically the novel two-channel storage, differential amplifier and stabilized integrator of FIGURE 1. In the drawings, like numerals refer to like elements, and primed numerals refer to elements performing substantially the same function, but modified slightly either as to function or as to structure.

FIGURE 1 shows a reactor 1 having disposed therein a thermistor 2 which comprises one branch of the alternating current (A.C.) bridge 3. Together these comprise a means for continuously measuring a condition and establishing a first continuous signal representative of the measurement. An oscillator 4 provides 94 cycle (c.p.s.) power to the bridge 3 and to one input of phase detector 5. An amplifier 7 connects the bridge to another input of the phase detector. The output terminals of the phase detector connect to a summing amplifier 9 which in turn connects to one channel of the two-channel storage unit 10. The output terminals of the unit 10 are connected to a differential amplifier 12 which in turn has output terminals 14 at which appear the signals representing the rate of change. A stabilized integrator 16 is connected between the output of amplifier 12 and the input to the second channel of the unit 10.

In FIGURE 2 is shown the bridge 3 of FIGURE 1. The oscillator 4 is coupled through transformer 20 to the input terminals 21 and 22 of the bridge 3. Connected in series between the terminals 21 and 22 are resistor 23, potentiometer 24 and resistor 25. The output signal from the bridge is drawn from the contactor of potentiometer 24 and appears between there and ground at terminals 26 and 27. The other two branches of the bridge are connected between terminals 21 and 22 in a series circuit comprising resistors 30 and 31, thermistor 2, and resistor 32. A capacitor 35 and resistor 36 are connected in series between the resistors 30 and 32. The capacitor is to compensate the bridge for cable capacitance, and resistor 36 is to give linearity to the bridge output, i.e. to compensate for the non-linearity of thermistor 2. A lead 37 provides a common ground to the circuit comprising the elements 31, 2, 35 and 36.

In FIGURE 3 the phase detector 5 is shown to be coupled through transformer 40 to oscillator 4. Power is applied from the secondary of the transformer through resistors 41 and 42 to a first pair of input terminals of the full wave bridge rectifier 43, and through resistors 45 and 46 to a first pair of input terminals of a second full wave bridge rectifier 47. The rectifiers 43 and 47 are commercially available units which have been modified by substituting silicon diodes for those originally supplied. This improves the linearity and zero offset of the apparatus.

Amplifier 7 is coupled to the phase detector through transformer 49 via the amplifier output terminals 26' and 27'. Each end of the transformer secondary 49a is connected to a third terminal in the respective rectifiers 43 and 47. The secondary 49b is connected in like manner to fourth terminals of the rectifiers. Output signals from the phase detector appear in leads 50 and 51 which are connected to ground through resistors 53 and 54, respectively.

The signals appearing in the leads 50 and 51 are next applied to the summing amplifier 9. This amplifier comprises a fixed lag linear combiner having both inputs active. The signal appearing in lead 50 is applied across resistor 56 to the first input of an inverting amplifier 57. A feedback circuit from the output of the amplifier to this input terminal comprises parallel connected resistor 58 and capacitor 59. The signal appearing in lead 51 is applied across resistor 60 to the junction 61 where it is added to a positive polarity signal from the voltage dividing circuit 62. This signal is then applied to the second input of the amplifier 57. This second input is isolated from the lead 50 by a capacitor 64. The output signal from the summing amplifier 9 appears at terminal 66.

As best seen in FIGURE 4, the signal appearing at terminal 66 is then applied to one channel of the two channel storage unit 10. This unit includes a number of switching elements which are operated in unison in order to carry on the receiving of input signals and storage of successive discrete (instantaneous) values thereof and the establishment of output signals from each channel, said output signals comprising a series of discrete signals each one of which is representative, in succession, of the immediately preceding discrete value of the input signals to the unit 10. The timer (FIGURE 1) is the means for operating these various switches in unison. In detail, the timer comprises a 60 c.p.s. source 80 which provides power to a motor 82 that drives a switch 84 which operates between contacts 86 and 88. If necessary, a power transmission means such as a gear box represented schematically as 89 may be used to adjust the speed with which switch 84 reciprocates between the contacts. The source 80 is coupled through transformer 90 to provide power to the contacts 86 and 88. One end of the transformer is connected to 86 through a series circuit comprising resistor 92 and rectifier 94. The other end of the transformer secondary is connected to 88 in like manner through resistor 98 and rectifier 100 to the contact 88. Capacitors 102 and 104 connect their respective terminals to ground. Electrical impulses appearing on the switch 84 are applied through a resistor 106 and the grounded capacitor 108 to four series connected relay coils, as hereinafter described. This arrangement permits simultaneous actuation of all four relays, thereby to permit the events of signal storage and establishment of signals to take place in unison and in a cooperative manner.

The circuit of unit 10 is substantially the same as that shown for a digital to analog hold circuit in my copending application Serial No. 770,693, filed October 24, 1958. The signal appearing at terminal 66 is applied through resistor 151 to the blade of a chopper 153. Contact 153a of the chopper is connected to a grounded capacitor 154a and contact 155a of a chopper 155. Similarly, the other contact 153b of the chopper is connected to the grounded capacitor 154b and the second contact 155b of the chopper 155, the blade of which is connected to the grid of cathode follower 157. Series connected coils 153c and 155c operate the choppers and are connected by terminal 158 to a source of chopper actuating signals, namely the impulses received from the switch 84.

Positive plate voltage is provided to the cathode follower 157 through the lead 159, and negative bias (−300 v.) is provided to the cathode through resistor 160. The output from 157 is applied across adjustable resistor 162 and fixed resistor 163 to a first input of the amplifier 164 and the differential amplifier unit 12.

The differential amplifier 12 includes a feedback circuit from its output to the aforesaid first input terminal through the resistor 165. The output signal from the differential amplifier is applied to the input of the drift stabilized integrator 16, specifically across the resistor 166 and capacitor 167 to the input of phase inverting amplifier 168. A drift stabilizing amplifier 169 is connected between the resistor 166 and the other input of amplifier 168. Negative potential is applied to the first-said input from potentiometer 171 across resistor 170. A feedback circuit from the output of 168 to the first said input via the capacitor 167 is provided through capacitor 172.

The circuit output terminals 14, whereat the rate of change signals appear, are connected to the output of differential amplifier 13 across resistor 174.

The input terminal of the second channel of the unit 10 is connected to the output of the integrator 16. The output of amplifier 168 is applied across resistor 175 to a chopper 177 having an upper contact 177a connected through a grounded capacitor 178a and to a contact 179a of the contactor 179. Similarly, the contact 177b is connected to a grounded capacitor 178b and to the contactor 179b. The respective choppers are actuated from coils 177c and 179c which are series connected with 153c and 155c. As mentioned before, this means that all four choppers work simultaneously in order to effect their events of storage and establishing a signal having a discrete value.

The signal from chopper 179 is applied to the grid of a cathode follower 180 which transmits its output signal through adjustable resistor 181 and resistor 182 to a second input terminal of the amplifier 164. This second input terminal is also connected by resistor 183, potentiometer 184 and fixed resistor 185 to a source of positive potential. The other end of 184 is connected across a resistor circuit to ground. Plate voltage is applied to cathode follower 180 through a lead 189 and the cathode is biased from a source of negative potential (−300 v.) by resistor 190.

The oscillator 4 is of conventional construction and is designed to provide 94 c.p.s. power to both the bridge and the phase detector. This frequency is desired because it prevents stray currents and background noise from affecting the operation of the apparatus shown. The amplifier 7 comprises two identical feedback stabilized amplifiers which raise the input signal from the bridge to a level suitable for operation of the phase detector 5.

The operation is as follows: Assume a polymerization reaction is taking place in the reactor 1. The temperature of this reaction is sensed by thermistor 2 which, by its impedance change, unbalances the bridge 3 and causes a change in the amplitude of the output signal from the bridge (this being an A.C. bridge). The bridge signal is amplified and then applied to one input of the phase detector 5, wherein it is converted to a D.C. signal proportional to reactor temperature. The phase detector produces a push-pull direct current output that varies linearly with the output signal voltage of amplifier 7. In an actual embodiment using 94 c.p.s. signals, the instant construction also removed background noise (e.g. stray 60 c.p.s.) and thus provided an output signal free of noise effects. The D.C. is then applied to the summing amplifier 9, where, in addition to filtering, this push-pull output is combined into a high level D.C. signal. The summing amplifier also provides a high impedance to prevent overloading the phase detector, which latter would destroy the linearity of the detector output.

At this point (and instant of time) it is assumed that the choppers 153, 155, 177 and 179 are all in the position shown in FIGURE 4. Thus, the output signal from the summing amplifier is applied to the capacitor 154a and stored thereon until such time as the timer moves chopper 153 against contact 153b. With the choppers in the position shown, the previously stored signal, the signal in capacitor 154b is being applied to the cathode follower 157. From the latter it is then applied to the first channel of differential amplifier 12.

Meanwhile, a signal established by the integrator 16 is applied in like manner to the chopper 177 and stored on capacitor 178a while simultaneously the previously applied signal from the integrator which has been stored in capacitor 178b is applied to cathode follower 180. From the latter the signal is applied to the second terminal of the differential amplifier 12.

The differential amplifier 12 may be a subtracting circuit or it may be a summing circuit with means for changing the polarity of the signals applied thereto to effect the subtracting function. For the sake of simplicity the configuration shown is preferred. The instant arrangement permits the subtraction of the first channel from the second channel, i.e. subtracts the signal from cathode follower 157 from that of cathode follower 180. The output from the differential amplifier then appears at the terminals 14. This is the circuit output. The signal that appears at 14 is the signal that represents the rate of change of the measured condition in the reactor 1.

This output signal is also applied to the input of the integrator 16 where it is employed to adjust the magnitude of the signal applied to the second channel of the unit 10.

In substance, the function of each channel in the unit 10 is to convert a varying continuous input signal to a storage signal by applying to the respective capacitors, and then to remove the storage signal, and to do so in such a manner that these varying input signals are converted to a series of discrete signals, each of the discrete signals when established being representative of the value of the continuous input signal that was stored during the preceding interval of time. For example, imagine temperature signals No. 1, 2 and 3 as they occur in succession in time at the thermistor 2. Assume further that signal No. 3 is the one presently being measured and stored on 154a. This means that signals 1 and 2 have already occurred. It also means that the signal 2 is simultaneously being applied through the first channel, i.e. to the cathode follower from the capacitor 154b. At this same time, the No. 1 signal (as subtracted in 12 and integrated in 16) is being applied to the other channel of 10 from the capacitor 178b, while the integrated signal (which is a function of signal No. 2 in this instance) is being stored on the capacitor 178a. Since the switches are operated in unison, the same time boundaries are established for: storage of No. 3; application or removal from storage of No. 2, subtracting and integrating No. 2 and storing the result (as on 178a) and removing from storage No. 1 in its subtracted-integrated form.

In one embodiment of this invention which has been constructed, the bridge circuit was adjusted so that for 300° F. reactor temperature a zero output was obtained from the summing amplifier. A reactor temperature of 275° F. resulted in a −50 volt D.C. output and a temperature of 325° F. resulted in a +50 D.C. volt output from the summing amplifier. The timer was adjusted to switch the choppers 153, 155, 179, 177 at the rate of a tenth of a cycle per second. The overall gain of the storage channels integrator, and the differential amplifier was adjusted to be unity. When constant temperature conditions prevailed in the reactor, the output of the differential amplifier was zero, but when there was a constant rate of change in the reactor temperature (i.e. a linear increase or decrease) the output of the differential amplifier assumed a constant value. The magnitude of the D.C. voltage output from the differential amplifier indicated the rate of change (as it does in all cases) while the polarity indicated the direction of change.

It should be understood that rate of change computation can be performed by my invention for other than temperature change, e.g. flow of pressure.

With the exception of amplifier 169, the amplifiers shown in FIGURES 3 and 4 are all phase inverting operational amplifiers such as model K2W manufactured by the George A. Philbrick Researches, Inc., Boston, Massachusetts. The performance characteristics, application and specifications of these amplifiers are described in "Applications Manual for Philbrick Octal Plug In Computing Amplifiers," copyright 1956 by George A. Philbrick Researches. The amplifier 169 is a stabilizing amplifier such as model K2P made by the aforesaid Philbrick and is described in the aforesaid manual.

While I have shown my invention with respect to a specific embodiment and described it with respect to a specific performance, it is not my intention to limit myself to the exact structure shown nor to limit this invention to the exact application described, but to include as my invention all those modifications of the structure and application of this means for producing a signal representative of the rate of change of an input signal to a circuit.

I claim:

1. Apparatus for producing a signal representative of the rate of change of a measured condition, wherein the measured condition is represented by a continuous signal, comprising first signal storage means; means to apply said continuous signal to said first storage means; second signal storage means; signal subtracting means having first and second inputs; means connected to said first storage means to apply a first series of discrete signals representative of successive instantaneous values of said continuous signal to the first input of said subtracting means; means connected to said second storage means to apply a second series of discrete signals representative of successive instantaneous values of the input signal applied to said second storage means to the second input of said subtracting means; signal integrating means; means connecting the output of said subtracting means to the input of said integrating means; and means connecting the output of said integrating means to the input of said second storage means to establish said input signal, the output of said subtracting means being representative of said rate of change.

2. The apparatus of claim 1 wherein said signal subtracting means comprises a differential amplifier.

3. Apparatus for producing a signal representative of the rate of change of a measured condition, wherein the measured condition is represented by a continuous signal, comprising first, second, third and fourth signal storage means; first switching means to apply said continuous signal selectively to said first and second storage means; signal subtracting means having first and second inputs; signal integrating means having the input thereof connected to the output of said subtracting means; second switching means connecting the output of said integrating means selectively to said third and fourth storage means; third switching means connecting said first and second storage means selectively to the first input of said subtracting means; and fourth switching means connecting said third and fourth storage means selectively to the second input of said subtracting means, the output of said subtracting means being representative of said rate of change.

4. The apparatus of claim 3 wherein said first, second, third and fourth storage means are first, second, third and fourth capacitors, respectively.

5. The apparatus of claim 3, further comprising means to actuate said first, second, third and fourth switching means in unison so that said continuous signal is applied to said first storage means, said second storage means is connected to the first input of said subtracting means, said fourth storage means is connected to the second input of said subtracting means, and the output of said integrating means is connected to said third storage means when said means to actuate is in a first position, and said continuous signal is applied to said second storage means, said first storage means is connected to the first input of said subtracting means, said third storage means is connected to the second input of said subtracting means, and the output of said integrating means is connected to said fourth storage means when said means to actuate is in a second position.

6. The apparatus of claim 5, further comprising means to move said means to actuate to said first and second positions alternately at a preselected frequency.

7. The apparatus of claim 3 wherein said signal subtracting means comprises a differential amplifier.

References Cited in the file of this patent

UNITED STATES PATENTS

| | | |
|---|---|---|
| 2,565,922 | Howard | Aug. 28, 1951 |
| 2,609,448 | Bedford et al. | Sept. 2, 1952 |
| 2,671,608 | Hirsh | Mar. 9, 1954 |
| 2,794,173 | Ramey | May 28, 1957 |
| 2,848,159 | Stephenson et al. | Aug. 19, 1958 |
| 2,928,602 | Quinn | Mar. 15, 1960 |

OTHER REFERENCES

Automatic Measurement Computation and Recording (Baker), Review of Scientific Instruments, vol 22, No. 6, June 1951, p. 376.